US012793272B2

(12) United States Patent
Johnson, Jr. et al.

(10) Patent No.: US 12,793,272 B2
(45) Date of Patent: Nov. 10, 2026

(54) IMAGE COMPRESSION AND RECONSTRUCTION USING MACHINE LEARNING MODELS

(71) Applicant: Google LLC, Mountain View, CA (US)

(72) Inventors: Joseph Johnson, Jr., Austin, TX (US); Shiblee Hasan, Santa Clara, CA (US); Emmanouil Koukoumidis, Kirkland, WA (US); Dustin Abramson, Bellevue, WA (US)

(73) Assignee: GOOGLE LLC, Mountain View, CA (US)

( * ) Notice: Subject to any disclaimer, the term of this patent is extended or adjusted under 35 U.S.C. 154(b) by 297 days.

(21) Appl. No.: 18/724,026

(22) PCT Filed: Jan. 24, 2022

(86) PCT No.: PCT/GR2022/000003

§ 371 (c)(1),
(2) Date: Jun. 25, 2024

(87) PCT Pub. No.: WO2023/139395

PCT Pub. Date: Jul. 27, 2023

(65) Prior Publication Data

US 2025/0069270 A1 Feb. 27, 2025

(51) Int. Cl.

*G06T 7/11* (2017.01)
*G06T 9/00* (2006.01)
*G06V 10/74* (2022.01)

(52) U.S. Cl.

CPC .................. *G06T 9/00* (2013.01); *G06T 7/11* (2017.01); *G06V 10/761* (2022.01)

(58) Field of Classification Search

None
See application file for complete search history.

(56) References Cited

U.S. PATENT DOCUMENTS

2005/0131660 A1* 6/2005 Yadegar .................. G06T 9/002 375/240
2021/0195244 A1 6/2021 Ross

OTHER PUBLICATIONS

Hillen, Brittany, "NVIDIA Research develops a neural network to replace traditional video compression," www.dpreview.com, Oct. 6, 2020, 8 pages.

(Continued)

*Primary Examiner* — Idowu O Osifade

(74) *Attorney, Agent, or Firm* — DORITY & MANNING, P.A.

(57) ABSTRACT

A method includes obtaining image data, identifying a machine learning-compressible (ML-compressible) portion of the image data, and determining a location of the ML-compressible portion within the image data. The method also includes selecting, from a plurality of ML compression models, an ML compression model for the ML-compressible portion based on an image content thereof, and generating, based on the ML-compressible portion and by the ML compression model, an ML-compressed representation of the ML-compressible portion. The method further includes generating a compressed image data file that includes the ML-compressed representation and the location of the ML-compressible portion, and outputting the compressed image data file. The compressed image data file is configured to cause an ML decompression model corresponding to the ML compression model to generate a reconstruction of the ML-compressible portion of the image data based on the ML-compressed representation.

20 Claims, 9 Drawing Sheets

(56) References Cited

OTHER PUBLICATIONS

Lee et al., "A real-time grid map generation and object clarification for ground-based 3D LIDAR data using image analysis techniques," 2010 17th IEEE International Conference on Image Processing (ICIP 2010), 2010, pp. 2253-2256 (Abstract only).
Pistori et al., "A new strategy for applying grammatical inference to image classification problems," 2013 IEEE International Conference on Industrial Technology (ICIT), 2013, pp. 1032-1037.
Ramesh et al., "Zero-Shot Text-to-Image Generation," arXiv:2102.12092v2, Feb. 26, 2021, 20 pages.

* cited by examiner

IMAGE COMPRESSION AND RECONSTRUCTION USING MACHINE LEARNING MODELS

CROSS-REFERENCE TO RELATED APPLICATIONS

The present application is a National Stage Application under 35 U.S.C. § 371 and claims priority to International Patent Application No. PCT/GR2022/000003, filed Jan. 24, 2022, and titled "Image Compression and Reconstruction Using Machine Learning Models," which is incorporated herein by reference in its entirety.

BACKGROUND

Digital image data may be compressed in order to provide advantages such as reducing the costs of storage and/or transmission of the digital image data. A variety of lossy and lossless methods for image data compression exist. Lossy image data compression methods result in a compressed version of input image data that cannot be used to regenerate the input image data exactly. Nonetheless, such lossy compression methods permit the generation of output image data that appears sufficiently similar to the input image data to human perception so as to be acceptable in at least some contexts. Some lossy image data compression techniques may permit this degree of similarity to be traded for increased compression ratios, allowing for smaller compressed image data file sizes in return for reduction in the image quality of the output image data.

SUMMARY

Image data may be compressed by a machine learning (ML) compression model, and subsequently decompressed using an ML decompression model. Specifically, one or more ML-compressible portions, and possibly one or more non-ML-compressible portions, may be identified within the image data. Corresponding ML compression models may be selected for each of the ML-compressible portions, and may be used to generate ML-compressed representations of these ML-compressible portions. The ML-compressed representations may include, for example, a combination of text and vectors. Relative location of different portions of the image data may be represented by the ML-compressed representations and/or separate location data, thus allowing the different portions to be recomposed at decompression time in the same or similar manner as in the original image data. A compressed image data file may be generated based on the ML-compressed representations, and possibly also based on non-ML-compressed representations of the non-ML-compressible portions. The compressed image data file may be used by one or more ML decompression models to generate a reconstruction of the image data.

In a first example embodiment, a method may include obtaining image data, identifying an ML-compressible portion of the image data, and determining a location of the ML-compressible portion within the image data. The method may also include selecting, from a plurality of ML compression models, an ML compression model for the ML-compressible portion of the image data based on an image content thereof. The method may additionally include generating, based on the ML-compressible portion of the image data and by the ML compression model, an ML-compressed representation of the ML-compressible portion of the image data. The method may further include generating a compressed image data file that includes the ML-compressed representation and the location of the ML-compressible portion. The compressed image data file may be configured to cause an ML decompression model corresponding to the ML compression model to generate a reconstruction of the ML-compressible portion of the image data based on the ML-compressed representation. The method may further include outputting the compressed image data file.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
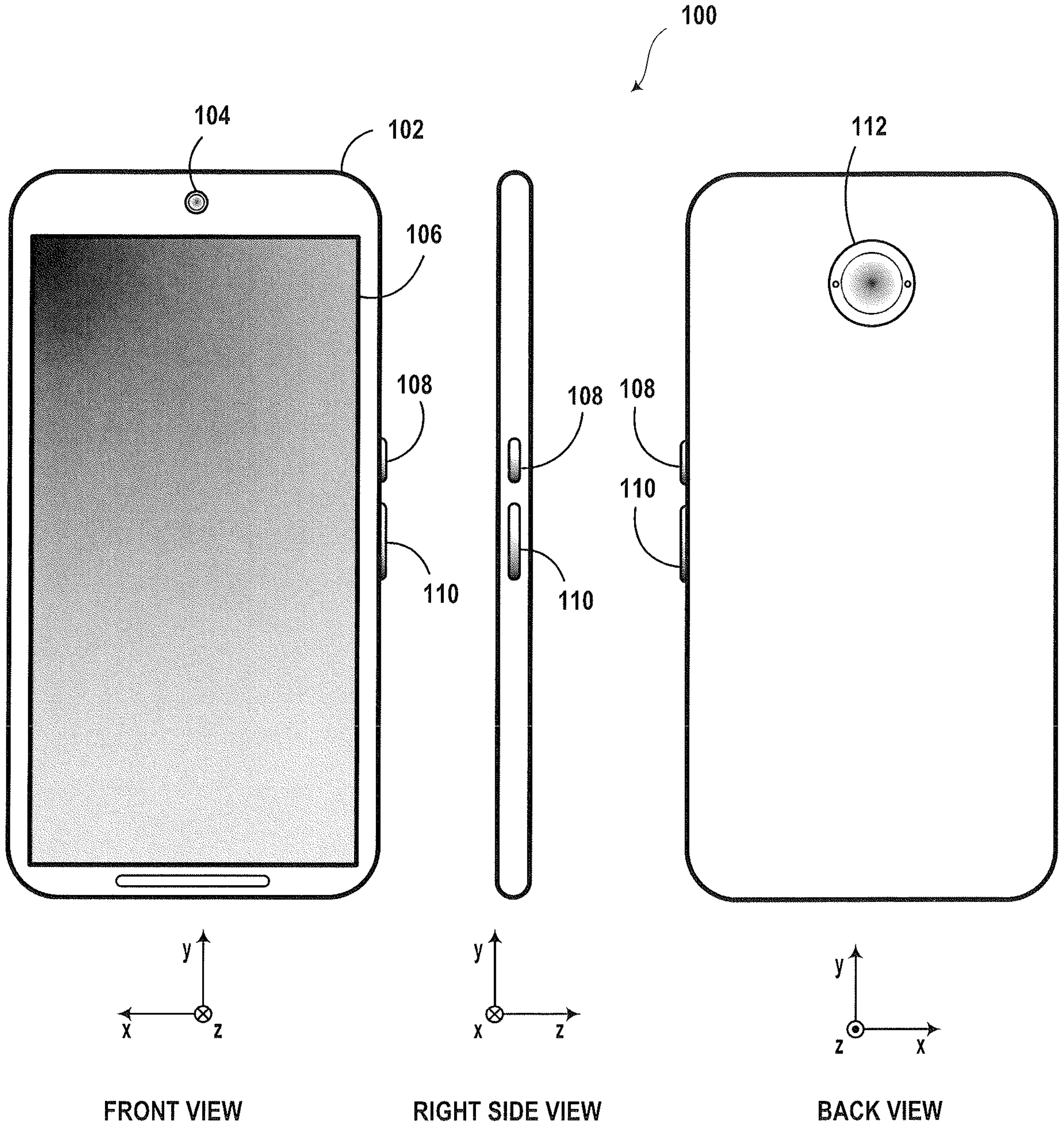
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

As the number of photos and videos generated by computing devices increases, the amount of storage resources used for storing such image data also increases. Thus, it becomes increasingly important to develop methods and systems that are able to efficiently and/or accurately compress and decompress the image data, thereby improving the efficiency with which the storage resources are utilized. One approach for compressing image data may involve training a first machine learning (ML) model to compress at least part of the image data by generating a latent space representation thereof, and training a second ML model to decompress the latent space representation into a reconstruction of at least the part of the image data.

Latent state representation may compress the image data to a greater extent than conventional image compression algorithms because at least some of the information discarded during compression can be replaced by the second ML model, which has been trained to understand various commonalities and patterns generally present in image data of a particular type. This compression approach may be substantially lossless in terms of resolution and spatial frequency, since these properties of the reconstruction may be controlled by adjusting the second ML model, but may be lossy in terms of visual accuracy, since the decompression of the latent space representation may be an underdetermined task.

The visual accuracy of reconstructions of ML-compressed image data may be improved, while at the same time decreasing the compressed file size, by combining different types of latent space representations into a unified ML-compressed representation. For example, the ML-compressed representation may include a textual description of the image data and one or more vector-based representations of different parts of the image data. The textual description may be well-suited to (e.g., more efficient at) describing a high-level composition of the image data, while the vector-based representations may be well-suited to describing the low-level details of various semantically-distinct portions of the image data. Accordingly, the ML compression and decompression systems may include a combination of text-based ML models configured to utilize textual strings as latent space representations and vector-based ML models configured to utilize vectors as latent space representations. For example, the ML compression system may be configured to divide the image data into a plurality of semantically-distinct portions and select, for each semantically-distinct portion and/or grouping thereof, a corresponding ML compression model to be used to generate a representation thereof.

In one example, the image data may represent a man and a woman against a desert landscape. Accordingly, the ML-compressed representation may use text to indicate, for example, that the man is to the right of the woman, and that the man and woman are in a desert landscape, and may use two face embedding vectors-one embedding vector to represent the details of the man's face and another embedding vector to represent the woman's face. Specifically, the visual features of a face may be more efficiently and/or accurately encoded as values of a vector than as a textual description, since human language may lack the informational capacity for efficiently expressing the detailed structure of a face. On the other hand, the relative position of subjects of the image data and/or the general background content thereof may be more efficiently and/or accurately encoded as a textual description than as a vector, since human language may have the informational capacity for efficiently expressing such high-level concepts.

Additionally, the visual accuracy of an image data reconstruction may be based on an observer's perception. In the example of the man and woman against the desert background, the man and/or the woman may notice inaccuracies in the reconstruction of the man's face and/or the woman's face. However, a third-party to whom the man and the woman are strangers might not notice if the man's face and/or the woman's face is inaccurately reconstructed. Accordingly, a visual accuracy of the visual reconstructions may be improved, while reducing the compressed file size, by performing the compression in a user-specific manner that takes into account the user's visual perception. Similarly to existing lossy techniques, therefore, the visual reconstructions may lose visual accuracy, however in contrast to other lossy techniques, the loss of visual accuracy can be adapted to the user.

In some implementations, the ML compression system may be configured to allow a user to manually specify an extent of compression for different types and/or instances of image content, and the ML compression system may thus apply different levels of compression thereto. For example, the user may indicate that images of the user's face and/or of people related to the user are to be represented more accurately by using larger embedding vectors, while the faces of people unrelated to the user might be represented using smaller embedding vectors or might not be represented at all.

Additionally or alternatively, the compression system may automatically learn the relative importance of different types and/or instances of image content to the user. For example, the ML compression system may generate a plurality of versions of a compressed image data file, each with a different compression rate for a given type and/or instance of image content. The ML decompression system may generate a plurality of reconstructions of the image data based on the plurality of versions of the compressed image data file, and the user's feedback about the perceived visual accuracy of the plurality of reconstructions may be requested and received. Thus, compression rates for various types and/or instances of image content may be empirically determined for the user. While the compression/decompression systems calibrate to the user in this manner, the system may store both (i) the ML-compressed representation and (ii) a conventionally compressed representation, thus allowing the original image content to be recovered if the user indicates that a particular type and/or instance of image content has been compressed too extensively, and is therefore not represented with sufficient visual accuracy.

In some cases, one or more portions of the image data might not be ML-compressed, and may instead be compressed using conventional image compression algorithms, thereby further improving the visual accuracy of reconstructions at the cost of a lower compression ratio. Thus, the compressed image data file may include ML-compressed representations of one or more ML-compressible portions and/or non-ML-compressed representations of one or more non-ML-compressible portions. The ML decompression system may be configured to use both types of representation in reconstructing the image data using the compressed image data file.

Further, some images may include redundant image content. For example, many images may be captured at a relatively small number of geographic locations, such as popular tourist attractions around the world. Thus, a plurality of images captured at approximately the same geographic location may share at least some image content. This shared image content may be leveraged to further increase the image compression rate, especially when the plurality of images is stored by an image database. Specifically, for a given ML-compressed image, one or more reference images that are similar to the given ML-compressed image may be identified by the ML decompression system. Similarity between images may be determined based on, for example, the ML-compressed representations thereof (e.g., based on the Euclidean distance between embedding vectors), and/or based on attribute data associated with the image files. The reference images may be provided as additional inputs to the ML decompression model(s), thus supplying the pixel values that may be missing from the ML-compressed representation.

In cases where the image data is a video that includes a plurality of sequential image frames, the video may be further compressed by omitting, from the compressed image data file, representations of at least some of the image frames of the video. Specifically, the ML compression system may generate compressed representations of a subset of image frames of the video, and a video interpolation may be used after decompression to generate, based on reconstructions of the subset of image frames, interpolated image frames to complete the video reconstruction. Thus, the systems and techniques discussed herein may be applied in any context where photo and/or video compression is desired, including on a personal computing device, in an image database, as part of a video call, and/or by a camera-based security system, among other possible applications.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Figure 2:
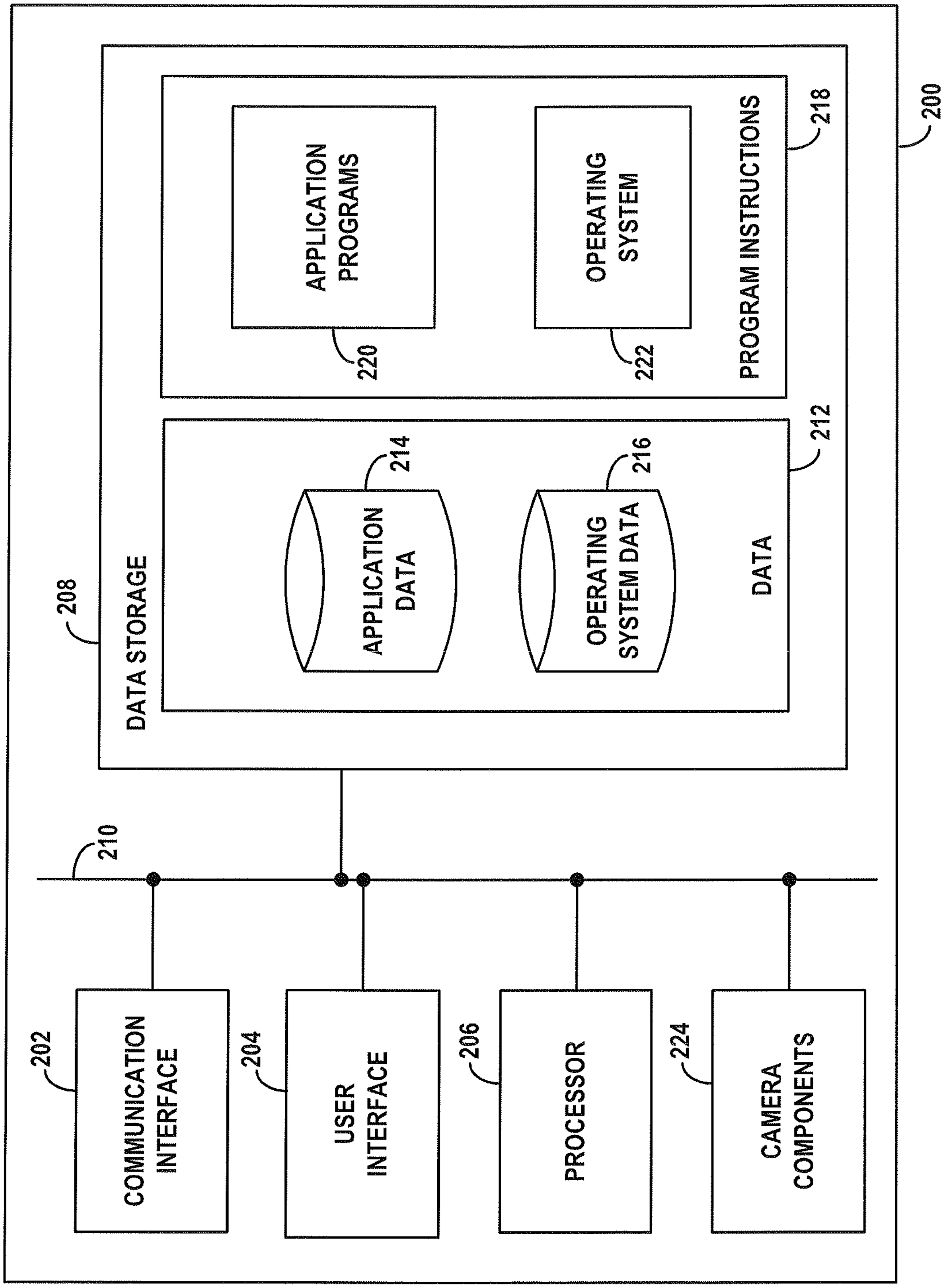
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, server, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port, among other possibilities. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)), among other possibilities. However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, LED, and/or OLED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers—1 millimeter), among other possibilities. Camera components 224 may be controlled at least in part by software executed by processor 206.

III. Example ML-Based Image Compression and Decompression Systems

Figure 3:
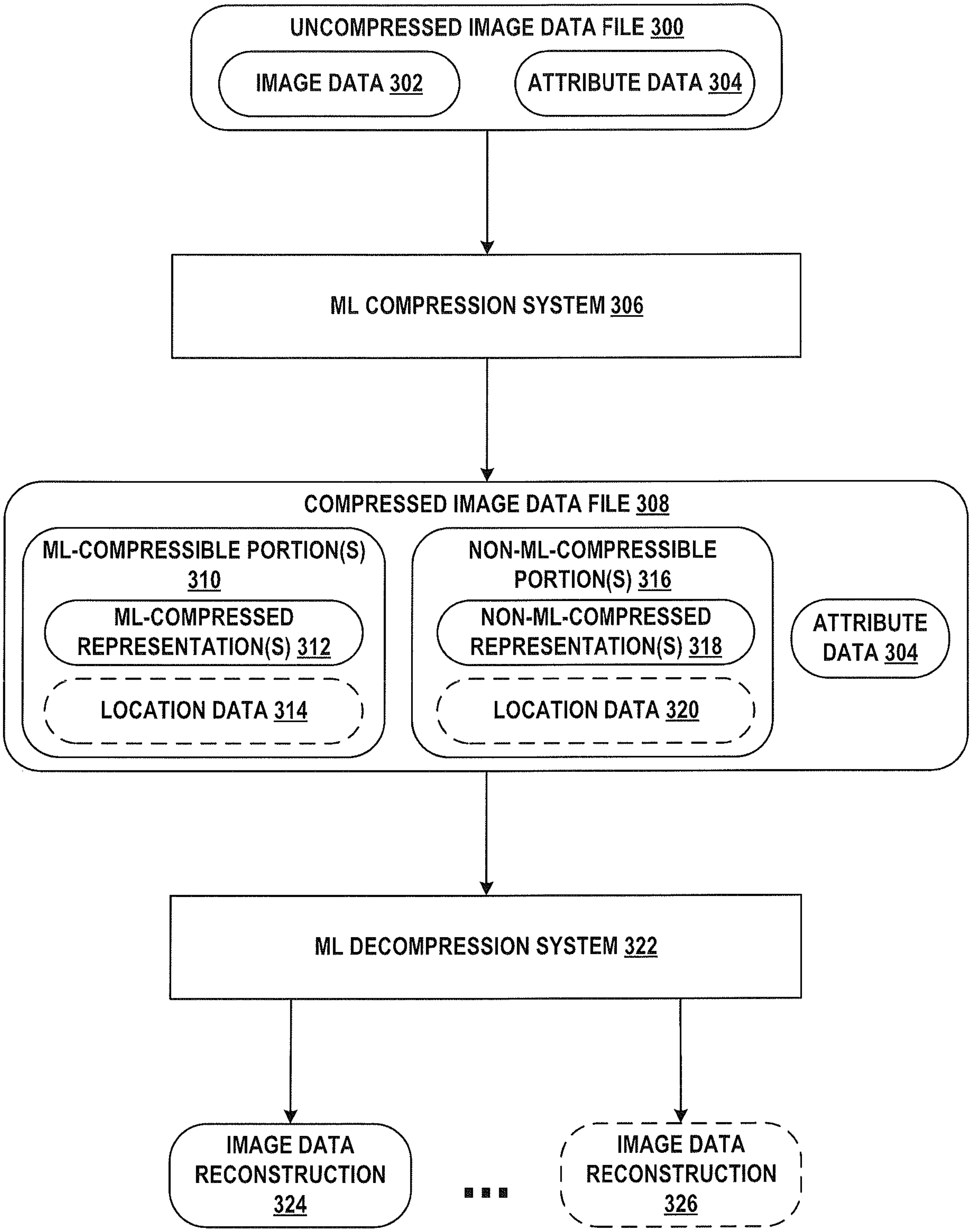
FIG. 3 illustrates an arrangement of systems for performing machine learning compression and decompression, in accordance with examples described herein.

FIG. 3 illustrates an example ML-based system for compressing and decompressing image data. Specifically, ML compression system 306 may be configured to generate compressed image data file 308 based on uncompressed image data file 300. ML decompression system 322 may be configured to generate at least image data reconstruction 324 based on compressed image data file 308. Compressed image data file 308 may be smaller than a version of uncompressed image data file 300 that has been compressed using a conventional image compression algorithm (e.g., Joint Photographic Experts Group (JPEG) compression). Compressed image data file 308 may thus reduce memory usage when stored on a computing device and/or reduce bandwidth usage when transmitted between multiple computing devices, among other benefits.

Uncompressed image data file 300 may include image data 302 and attribute data 304. Image data 302 may include one or more image frames, and may thus represent a still photograph and/or a video. Attribute data 304 may be indicative of the conditions and/or context in which image data 302 was generated. For example, attribute data 304 may include information indicative of a time at which image data 302 was captured, weather conditions at the time at which image data 302 was captured, a geographic location associated with image data 302 (e.g., indicating where image data 302 was captured), one or more parameters of a camera used to capture image data 302, and/or sensor data (e.g., depth data) generated by one or more sensors on the camera used to capture image data 302, among other possibilities. Thus, attribute data 304 may provide additional non-visual information that may facilitate generation of accurate image data reconstructions by ML decompression system 322.

Compressed image data file 308 may represent ML-compressible portion(s) 310 of image data 302 and non-ML-compressible portion(s) 316 of image data 302, and may include attribute data 304. In examples, compressed image data file 308 may be generated using the Exchangeable image file format (EXIF) and/or an extension thereof. ML-compressible portion(s) 310 may include ML-compressed representation(s) 312 and, in some cases, location data 314. For example, each respective ML-compressible portion of ML-compressible portion(s) 310 may represent an ML-compressible spatial and/or temporal subset of image data 302, and may be associated with a corresponding ML-compressed representation and, in some cases, a corresponding location within image data 302 (e.g., coordinate(s) in pixel space, time step(s) within a video, etc.). In some cases, the information represented by location data 314 may be implicitly represented by ML-compressed representation(s) 312, and thus might not be separately represented as part of compressed image data file 308, as indicated by the dashed line.

Non-ML-compressible portion(s) 316 may include non-ML-compressed representation(s) 318 and, in some cases, location data 320. For example, each respective non-ML-compressible portion of non-ML-compressible portion(s) 316 may represent a non-ML-compressible spatial and/or temporal subset of image data 302, and may be associated with a corresponding non-ML-compressed representation and, in some cases, a corresponding location within image data 302 (e.g., coordinates in pixel space, time step within a video, etc.). In some cases, the information represented by location data 320 may be implicitly represented by ML-compressed representation(s) 312, and thus might not be separately represented as part of compressed image data file 308, as indicated by the dashed line. In some cases, all portions of image data 302 may be ML-compressible, and compressed image data file 308 thus might not include non-ML-compressible portion(s) 316.

A given image data portion may be considered ML-compressible when at least one ML compression model is available to compress the given image data portion. A representation of the given image data portion may be considered ML-compressed when generated by the at least one ML model. The given image data portion may be considered non-ML-compressible when no ML models are available to compress the given image data portion, and/or when the given image data portion represents image content that one or more users have indicated is not to be ML-compressed (e.g., to avoid losing information about the image content during compression). Thus, the representation of the given image data portion may be considered non-ML-compressed when generated by an algorithm other than an ML model (e.g., Joint Photographic Experts Group (JPEG) compression) and/or when no image compression has been applied to the given image data portion. Accordingly, non-ML-compressed representation(s) 318 of non-ML-compressible portion(s) 316 may, in some cases, be generated by conventional image compression algorithms.

Image data reconstruction 324 may represent a visual approximation of image data 302. In some implementations, ML decompression system 322 may be configured to generate two or more such approximations, as indicated by image data reconstruction 324 through image data reconstruction 326 (i.e., image data reconstructions 324-326). Although each of image data reconstructions 324-326 may be generated based on compressed image data file 308, image data reconstructions 324-326 may differ from one another due to, for example, ML decompression system 322 operating based on one or more stochastic inputs. For example, ML decompression system 322 may be configured to generate each of image data reconstructions 324-326 based on at least one corresponding noise vector, which may be randomly generated, and may thus cause image data reconstructions 324-326 to differ from one another.

The spatial frequency content and/or resolution of image data reconstructions 324-326 may be controlled by ML decompression system 322, rather than by compressed image data file 308. That is, ML decompression system 322 may be configured to generate, based on compressed image data file 308, image data reconstructions 324-326 with varying spatial frequency content and/or resolution. Accordingly, the spatial frequency content and/or resolution of image data reconstructions 324-326 may be independent of the extent of compression applied by ML compression system 306, and may thus be substantially lossless relative to image data 302. However, a visual accuracy and/or fidelity of image data reconstructions 324-326 may be based on the extent of compression applied by ML compression system 306 when generating compressed image data file 308. Thus, the visual accuracy and/or fidelity of image data reconstructions 324-326 may be lossy with respect to image data 302.

In some implementations, ML compression system 306 and ML decompression system 322 may form part of the same computing system. For example, systems 306 and 322 may be used by a web-based image storage platform configured to store image data on behalf of a plurality of different users. In other implementations, systems 306 and 322 may form part of different computing systems. For example, ML compression system 306 may be provided on a first computing system associated with a first user, and ML decompression system 322 may be provided on a second computing system associated with a second user. Thus, the second computing system may be able to decompress image data that has been compressed by the first computing system, allowing for sharing of image data between these two computing systems. In further implementations, components of system 306 and/or system 322 may be distributed between multiple computing devices.

Figure 4A:
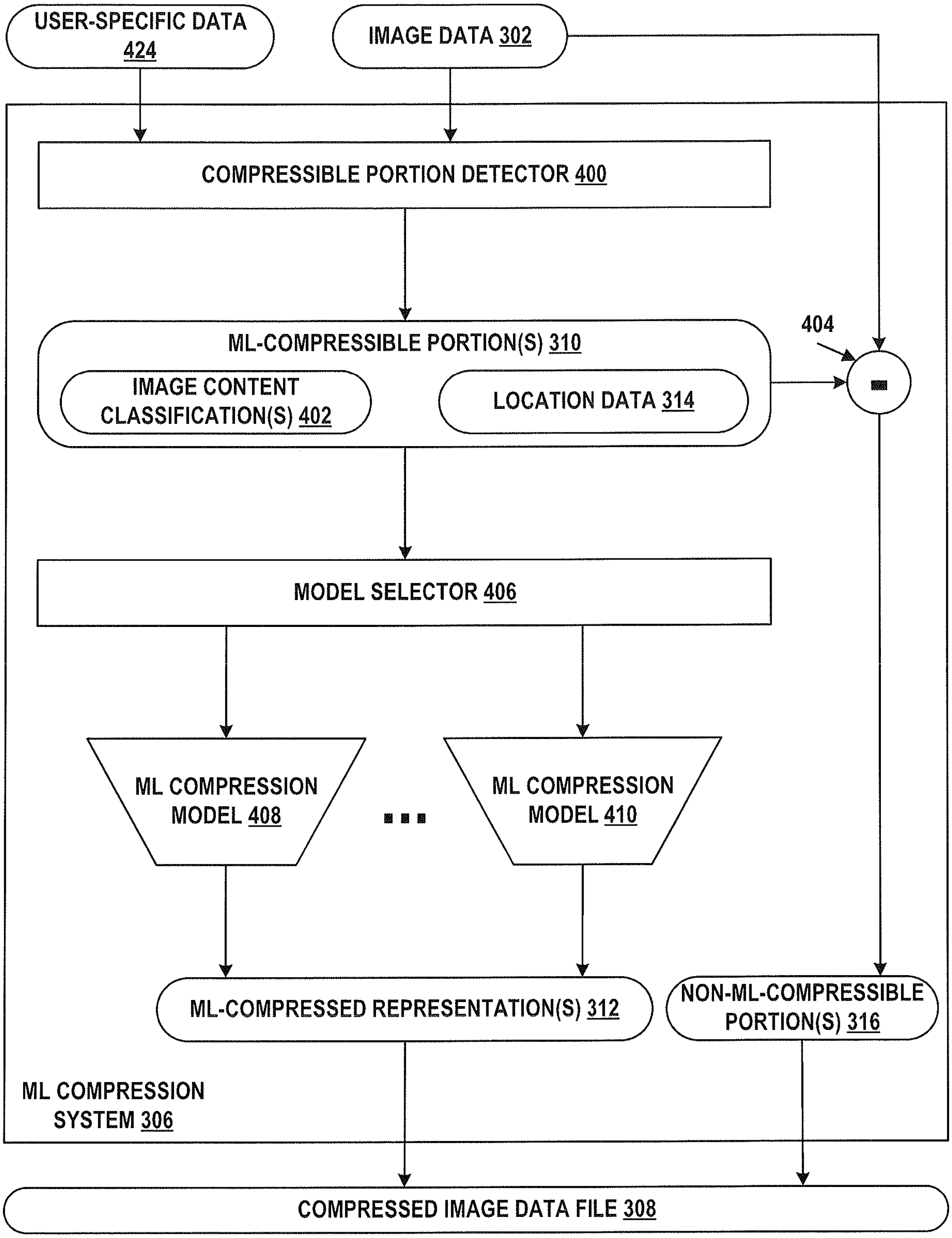
FIG. 4A illustrates an architecture of a machine learning compression system, in accordance with examples described herein.

FIG. 4A illustrates an example architecture of ML compression system 306. Specifically, ML compression system 306 may include compressible portion detector 400, model selector 406, ML compression model 408 through ML compression model 410 (i.e., ML compression models 408-410), and/or difference operator 404. Specifically, compressible portion detector 400 may be configured to identify ML-compressible portion(s) 310 of image data 302. Model selector 406 may be configured to select one or more of ML compression models 408-410 to be used to compress ML-compressible portion(s) 310. ML compression models 408-410 may be configured to generate ML-compressed representation(s) 312 of ML-compressible portion(s) 310. Difference operator 404 may be configured to determine non-ML-compressible portion(s) 316 based on image data 302 and ML-compressible portion(s) 310.

Compressible portion detector 400 may be configured to determine (i) image content classification(s) 402 of the image content(s) of ML-compressible portion(s) 310 and/or (ii) location data 314 indicative of respective locations of ML-compressible portion(s) 310 within image data 302. In some cases, compressible portion detector 400 may be configured to determine ML-compressible portion(s) 310 that are semantically distinct and/or spatially disjoint. For example, a first pixel group of image data 302 representing a human face may form a first ML-compressible portion, while a second pixel group of image data 302 representing an animal may form a second ML-compressible portion. The first pixel group and the second pixel group may be non-overlapping, and thus independently compressible using a corresponding ML compression model. Compressible portion detector 400 may include one or more ML models configured to identify, bound, and/or segment ML-compressible image contents.

A given image content may be considered ML-compressible when at least one of ML compression models 408-410 is configured to compress the given image content, and/or a corresponding ML decompression model is available to decompress a compressed version of the given image content. For example, each of ML compression models 408-410 may be configured to compress image data that represents a corresponding type of image content. Thus, ML compression models 408-410 may be collectively configured to generate ML-compressed representations of a plurality of different types of image content. The plurality of different types of image content may include human faces generally, a specific human face, clothing, human poses, background scenery, inanimate objects, and/or animals, among other possibilities. Using ML compression models that are content type specific may allow for generation of more accurate compressed representations than, for example, using a generalized ML compression model independently of image content type.

Image content classification(s) 402 may indicate, for each respective ML-compressible portion of ML-compressible portion(s) 310, a corresponding classification and/or type of image content represented by the respective ML-compressible portion. Thus, the corresponding classification of the respective ML-compressible portion may indicate a corresponding ML compression model of ML compression models 408-410 to be used for compressing the respective ML-compressible portion. Accordingly, as the image content types that are compressible by ML compression models 408-410 change, compressible portion detector 400 may be retrained to identify corresponding image content within image data 302.

Location data 314 may indicate respective positions of ML-compressible portion(s) 310 within image data 302, and may be used by model selector 406 and/or ML compression models 408-410 to locate, within image data 302, the pixels that form ML-compressible portion(s) 310. In one example, the location data for a respective ML-compressible portion may include a bounding box defining the respective ML-compressible portion, a segmentation map defining the respective ML-compressible portion, a pixel space coordinate of a centroid or other part of the respective ML-compressible portion, a number of pixels included in the respective ML-compressible portion, an indication of whether the respective ML-compressible portion is part of a background or a foreground of image data 302, and/or a direction (e.g., left, right, up above, down below, etc.) of the respective ML-compressible portion relative to one or more other portions of image data 302, among other possibilities.

In some implementations, compressible portion detector 400 may be configured to identify ML-compressible portion (s) 310 additionally based on user-specific data 424. Specifically, whether a given portion of image data 302 is ML-compressible and/or the extent of compression that may be applied thereto may depend on an importance of the given portion, for example as indicated by a user. Thus, user-specific data 424 may include various user attributes that may facilitate identification of ML-compressible portion(s) 310 by compressible portion detector 400. User-specific data 424 may be manually defined by the particular user, or may be learned based on feedback provided by the user based on the user's perceived quality of image data reconstructions 324-326.

In one example, user-specific data 424 may indicate one or more types of image content that are not to be ML-compressed (e.g., human faces), even if a corresponding ML compression model is available. In another example, user-specific data 424 may indicate specific instances of image content that are not to be ML-compressed (e.g., the face of the particular user, and the faces of other people related to the particular user). In a further example, user-specific data 424 may indicate an extent of compression that is to be applied to different types of image content and/or different instances thereof (e.g., use embeddings with 128 values to represent the particular user, and use embeddings with 64 values for all other content). User-specific data 424 may be modifiable, for example, by way of a user interface that provides, for each image content type, a corresponding user interface component (e.g., a slider) that allows for specification of the extent of compression to be applied to that image content type (e.g., ranging from 0, corresponding to no compression, to 100, corresponding to maximum possible compression).

In some cases, user-specific data 424 may be learned by systems 306 and/or 322 based on feedback provided by the user in response to viewing image data reconstructions 324-326. In one example, a plurality of instances of compressed image data file 308 may be generated by compressing different portions of image data 302 to varying extents, and the user may be prompted to select image reconstructions that are of acceptable visual quality. Thus, by varying the extent of compression applied to different types of image content, the system may empirically deduce values for user-specific data 424 that accurately represent the corresponding user's visual perception. While user-specific data 424 is being determined in this manner, a non-ML-compressed version of image data 302 may be maintained, such that original image data 302 may be recovered if the user indicated dissatisfaction with one or more reconstructions of image data 302. Once user-specific data 424 has been determined, non-ML-compressed duplicates of image data 302 might no longer be saved.

Model selector 406 may be configured to select, for each respective ML-compressible portion of ML-compressible portion(s) 310, a corresponding ML compression model of ML compression models 408-410 based on the image content classification of the respective ML-compressible portion. Model selector 406 may also be configured to provide, to the corresponding ML compression model, the image content indicated by the location data for the respective ML-compressible portion. Thus, model selector 406 may operate to route the pixel data of different ML-compressible portion(s) 310 of image data 302 to corresponding ML compression models that are configured to compress the pixel data.

ML compression models 408-410 may be configured to generate ML-compressed representation(s) 312 of ML-compressible portion(s) 310. For example, each respective ML-compressible portion of ML-compressible portion(s) 310 may be represented by a corresponding ML-compressed representation of ML-compressed representation(s) 312. ML-compressed representation(s) 312 may be interpretable and/or decodable by corresponding ML decompression models of ML decompression system 322. For example, ML compression models 408-410 may have been co-trained with the ML decompression models of ML decompression system 322.

In one example, ML-compressed representation(s) 312 may include one or more vectors representing the image contents of ML-compressible portion(s) 310. The one or more vectors may represent semantic embeddings of the image contents of ML-compressible portion(s) 310 in a latent space that is interpretable by corresponding ML decompression models of ML decompression system 322. Thus, an ML compression model may be alternatively referred to as an encoder and an ML decompression model may be alternatively referred to as a decoder. Whereas compressible portion detector 400 may be configured to detect a wide range of image contents, each ML compression model that is configured to generate a vector may be specialized with respect to a corresponding type of image content, and thus able to generate latent space embeddings that are usable to reconstruct the corresponding type of image content with at least a threshold accuracy.

Additionally or alternatively, ML-compressed representation(s) 312 may include one or more textual strings describing the image contents of ML-compressible portion(s) 310 and/or the spatial relationships therebetween. Thus, one or more of ML compression models 408-410 may be configured to generate textual representations of image data 302 and/or ML-compressible portion(s) 310 thereof. In one example, such models may be based on architectures that include a convolutional neural network, a recurrent neural network, a long short-term memory (LSTM) neural network, and/or a gated recurrent unit (GRU), as described in a paper titled "Show and Tell: A Neural Image Caption Generator," authored by Vinyals et al., and published as arXiv: 1411.4555, and/or a paper titled "Rich Image Captioning in the Wild," Tran et al., and published as arXiv: 1603.09016, among other possibilities. In another example, such models may include a transformer-based neural network model, as described in a paper titled "CPTR: Full Transformer Network for Image Captioning," authored by Liu et al., and published as arXiv: 2101.10804.

In one example, ML-compressed representation(s) 312 may include a textual string that describes the image content of ML-compressible portion(s) 310 at a high level, and one or more vectors that provide more detailed information regarding one or more of ML-compressible portion(s) 310. For example, when image data 302 represent a man walking a dog on a beach, ML-compressed representation(s) 312 may be "a man ($v_{man}=[m_1, m_2, \ldots, m_n]$) walking a dog ($v_{dog}=[d_1, d_2, \ldots, d_n]$) on a beach ($v_{beach}=[b_1, b_2, \ldots, b_n]$), where the text defines the general content of image data 302, and where $v_{man}$, $v_{dog}$, and $v_{beach}$ are n-valued (e.g., n=128) vectors that provide a more detailed (albeit compressed) representation of the man, dog, and beach, respectively.

Thus, in some implementations, at least a first ML compression model of ML compression models 408-410 (e.g., the ML compression model configured to generate the textual string) may be configured to process multiple portions of image data 302 in order to encode the relationships (e.g., spatial, temporal, semantic, etc.) therebetween. For example, the first ML compression model may receive as input multiple ML-compressible portions, at least one ML-compressible portion and at least one non-ML-compressible portion, multiple non-ML-compressible portions, and/or the entirety of image data 302. At least a second ML compression model of ML compression models 408-410 (e.g., the ML compression model configured to generate the embedding vector) may be configured to process only a single ML-compressible portion of image data 302 at a time in order to encode the visual content thereof (e.g., independently of any relationships between this single ML-compressible portion and other portions of image data 302). Further, although ML compression models 408-410 are shown as operating independently of one another, in some implementations, at least some of ML compression models 408-410 may operate sequentially, with the output of one ML compression model being provided as input to another ML compression model.

In some implementations, difference operator 404 may be configured to determine non-ML-compressible portion(s) 316 based on ML-compressible portion(s) 310. For example, difference operator 404 may be configured to subtract ML-compressible portion(s) 310, as indicated by location data 314 (e.g., in the form of segmentation mask(s)), from image data 302, thereby generating non-ML-compressible portion(s) 316. In other implementations, non-ML-compressible portion(s) 316 may be identified directly by compressible portion detector 400, rather than by difference operator 404.

ML-compressed representation(s) 312, possibly along with location data 314, may be stored in compressed image data file 308 to represent ML-compressible portion(s) 310. Additionally, non-ML-compressed representation(s) 318 (not shown in FIG. 4A), possibly along with location data 320, may be stored in compressed image data file 308 to represent non-ML-compressible portion(s) 316. In some cases, image data 302 may be divided into a grid (e.g., into four quadrants), and the operations discussed above may be performed with respect to each cell of the grid.

Figure 4B:
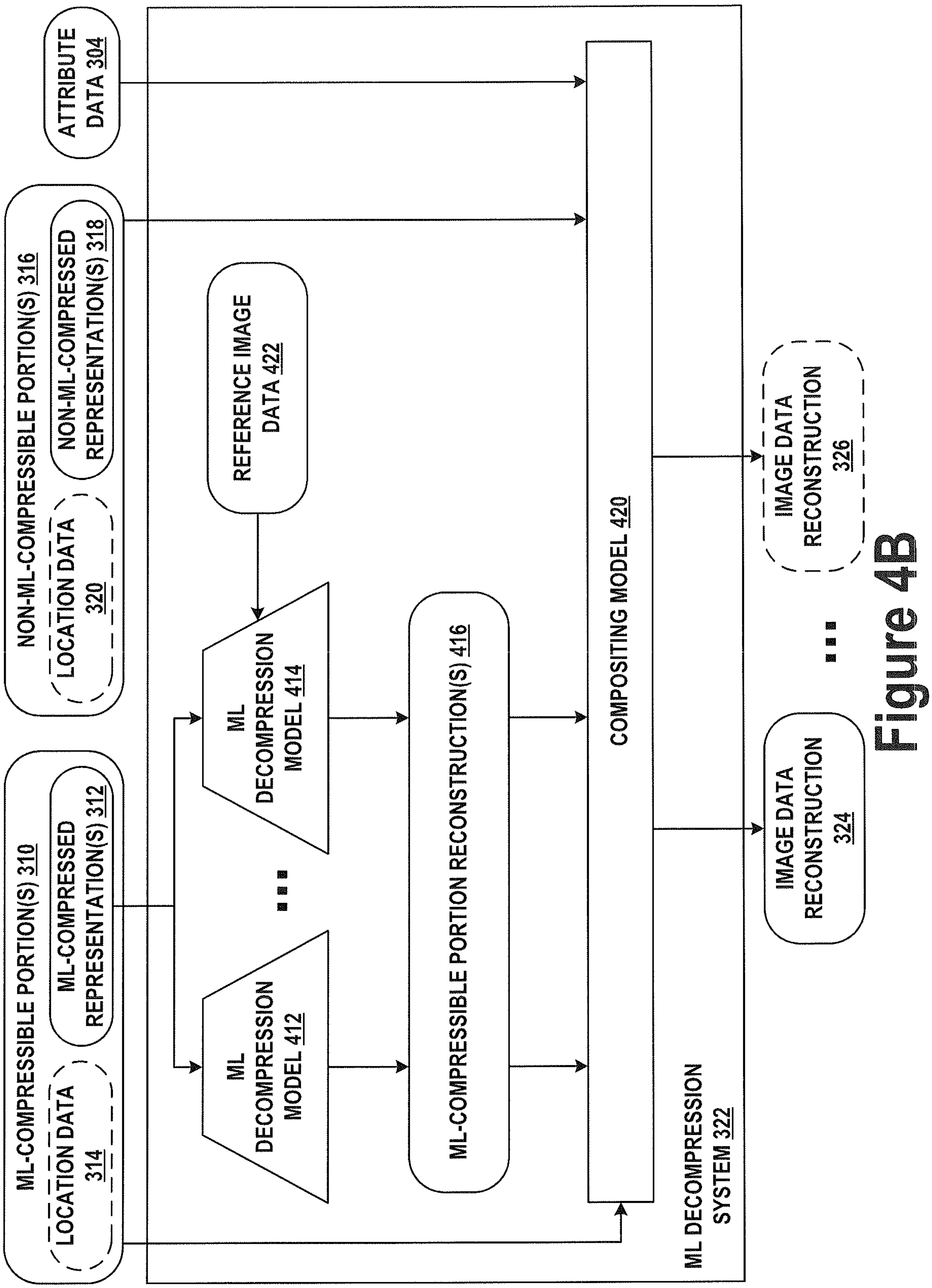
FIG. 4B illustrates an architecture of a machine learning decompression system, in accordance with examples described herein.

FIG. 4B illustrates an example architecture of ML decompression system 322. Specifically, ML decompression system 322 may include ML decompression model 412 through ML decompression model 414 (i.e., ML decompression models 412-414) and compositing model 420. Specifically, ML decompression models 412-414 may be configured to generate ML-compressible portion reconstruction(s) 416 of ML-compressible portion(s) 310. Compositing model 420 may be configured to generate image data reconstructions 324-326 based on ML-compressible portion reconstruction(s) 416, non-ML-compressed representation(s) 318, and/or attribute data 304 (and possibly also based on location data 314 and/or 320). ML decompression system 322 and/or components thereof may be executed locally by a client device (e.g., a smartphone) and/or remotely by a server device on behalf of the client device depending on, for example, data network access and/or availability of processing resources (e.g., tensor processing units) on the client device.

ML decompression models 412-414 may correspond to ML compression models 408-410, and may thus be configured to decode ML-compressed representation(s) 312 into ML-compressible portion reconstruction(s) 416. For example, each of ML decompression models 412-414 may be associated with, and thus configured to decode ML-compressed representations generated by, a corresponding ML compression model of ML compressions models 408-410.

In some implementations, ML decompression models 412-414 may be configured to generate ML-compressible portion reconstruction(s) 416 based on reference image data 422. In some cases, reference image data 422 may additionally or alternatively be used by compositing model 420. Reference image data 422 may include one or more image data that, at least in some respects, are similar and/or relevant to image data 302, and may thus provide visual information that may improve the visual accuracy of image data reconstructions 324-326. Specifically, due to being compressed, ML-compressed representation(s) 312 might lack some of the original information from image data 302. Reference image data 422 may provide additional visual information that may be used by ML decompression system 322 to compensate for the lack of some of this original information.

In one example, image data 302 may represent a particular person, and reference image data 422 may provide one or more additional representations of the particular person that may be used by one or more of ML decompression models 412-414 to more accurately recreate the representation of the particular person based on ML-compressed representation(s) 312. For example, a particular ML-compressed representation may be "An image of Jane Doe" and reference image data 422 may include one or more images of Jane Doe. Thus, compressed image data file 308 might, for example, not include any image data of Jane Doe, since reference image data 422 may be used to accurately reconstruct an image of Jane Doe. Compressed image data file 308 may, however, include pose embeddings, information about the age of Jane Doe when image data 302 was captured, and/or other attribute data that may be used to improve the accuracy with which image data 302 is reconstructed based on compressed image data file 308.

In another example, image data 302 may represent a common and/or well-known landscape, scene, and/or background (e.g., New York City Times Square, one of the seven wonders of the world, etc.), and reference image data 422 may provide one or more additional representations of this landscape, scene, and/or background that may be used by one or more of ML decompression models 412-414 to more accurately recreate the representation of this landscape and/or background based on ML-compressed representation(s) 312.

In general, image data 302 may represent a specific person, animal, location, inanimate object, and/or clothing, among other possibilities, and reference image data 422 may provide one or more additional representations of such image contents, thus allowing ML decompression system 322 to have access to visual data that might be missing from ML-compressed representation(s) 312 as a result of compression. Thus, when reference image data 422 is available for a given type and/or instance of image content, the extent of compression applied by ML compression system 306 may be increased (e.g., embedding size may be reduced from 128 to 64), thereby reducing the size of compressed image data file 308. Conversely, when reference image data 422 is not available for the given type and/or instance of image content, the extent of compression applied by ML compression system 306 may be decreased, thereby increasing the size of compressed image data file 308. In general, the extent of compression applied by ML compression system 306 for the given type and/or instance of image content may be proportional to a number of instances of and/or extent of reference image data 422 available at decompression time.

A plurality of instances of reference image data 422 may be available, for example, in an image storage database. Specifically, in the context of the image storage database, both ML compression system 306 and ML decompression system 322 may have access to reference image data 422, and may thus each be able to determine the availability of images with similar image content. Accordingly, ML compression system 306 may select the extent of compression applied to an ML-compressible portion of image data 302 based on a number of reference images available for the ML-compressible portion. For example, system 306 and/or 322 may be configured to identify, for a given portion of ML-compressible portion(s) 310, one or more similar reference images by comparing (e.g., using a distance metric) the ML-compressed representation of the given portion to ML-compressed representations of candidate reference image data. Additionally or alternatively, the one or more similar reference images may be identified based on attribute data 304 and commensurate attribute data associated with the candidate reference image data.

Compositing model 420 may include, for example, a neural network configured to (i) combine ML-compressed portion reconstruction(s) 416 and non-ML-compressed representation(s) 318 into at least one image, possibly based on attribute data 304 and/or location data 314 and/or 320 and/or (ii) generate any image content that might not already have been generated by ML decompression models 412-414. Compositing model 420 may include a convolution-based neural network model and/or a transformer-based neural network model, among other possibilities. In one example, compositing model 420 may include aspects of the model discussed in a paper titled "GP-GAN: Towards Realistic High-Resolution Image Blending," authored by Wu et al., and published as arXiv: 1703.07195, among other possible image blending models. Additionally or alternatively, compositing model 420 may include a DALL-E model and/or a DALL-E-like model, as described in a paper titled "Zero-Shot Text-to-Image Generation," authored by Ramesh et al., and published as arXiv: 2102.12092, among other possible image generation models.

Specifically, compositing model 420 may be configured to receive as input one or more of a vector, a textual string, ML compressible portion reconstruction(s) 416, non-ML-compressed representation(s) 318, and/or reference image data 422, and generate image data reconstructions 324-326 based thereon. For example, when image data 302 represent a man walking a dog on a beach, and ML-compressed representation(s) 312 thus includes "a man ($v_{man}=[m_1, m_2, \ldots, m_n]$) walking a dog ($v_{dog}=[d_1, d_2, \ldots, d_n]$) on a beach ($v_{beach}=[b_1, b_2, \ldots, b_n]$)," ML decompression models 412-414 may be configured to generate reconstructions of the man, dog, and beach based on, respectively, $v_{man}$, $v_{dog}$, and $v_{beach}$, while compositing model 420 may be configured to compose these reconstructions according to the textual description. In some cases, the reconstruction of, for example, the man, may be based on one or more other reference images of the man, thus allowing for a more accurate representation of the man to be generated. In some cases, compositing model 420 may be configured to inpaint missing image parts (e.g., between reconstruction(s) 416) and/or paint over parts of reconstruction(s) 416 to generate visually plausible, natural, and/or realistic transitions between different portions of image data reconstructions 324-326.

In implementations where location data 314 and/or 320 are explicitly represented in compressed image data file 308, location data 314 and/or 320 may be used by compositing model 420 to arrange ML-compressible portion reconstruction(s) 416, such that image data reconstructions 324-326 contain portion(s) 310 and/or portion(s) 316 in the same or similar arrangement as image data 302.

Attribute data 304 may be used by compositing model 420 to generate image data reconstructions 324-326 that are visually consistent with attribute data 304. For example, image data reconstructions 324-326 may be visually consistent with the time at which image data 302 was captured (e.g., night-time reconstructions may appear darker than day-time reconstructions), weather conditions under which image data 302 was captured (e.g., cloudy weather reconstructions may appear darker than sunny weather reconstructions), the geographic location associated with image data 302 (e.g., west-facing reconstructions may show a different part of a well-known location than east-facing reconstructions), the one or more parameters of the camera used to capture image data 302 (e.g., reconstructions may be consistent with a resolution of the camera, lens arrangement of the camera, intrinsic and/or extrinsic parameters of the camera, etc.), and/or the sensor data generated by one or more sensors on the camera used to capture image data 302 (e.g., the relative size of different portions may be consistent with the distances measured thereto), among other possibilities.

In some implementations, image data reconstructions of one or more image data may be generated before the one or more image data are explicitly requested to be viewed by way of a computing device. For example, an image data reconstruction of a given image data may be generated based on a prediction that a user will request to view the given image data within a threshold period of time. The prediction may be based on the user viewing multiple image data that has been grouped as part of the same "memory," and/or the user viewing a predetermined sequence of image data, among other possibilities. Accordingly, the operations of decompression system 322 may be completed before the user requests to view the image data, thus reducing and/or minimizing any apparent delay due to performing the decompression. Such "prefetching" of image data reconstructions may be performed, for example, for a predetermined number of instances of image data expected to be viewed and/or until the image data reconstructions fill up a prefetch buffer of the client device, among other possibilities.

In some implementations, attribute data 304 and/or latent space representations thereof may be controllable and/or modifiable. For example, a user interface may allow attribute data 304 and/or one or more intermediate states of compositing model 420 to be modified in order to control the visual properties of image data reconstructions 324-326. Accordingly, a user may be able to control the appearance of image data reconstructions 324-326 by specifying updated values for attribute data and/or updated values for the one or more intermediate states of compositing model 420.

In some cases, when textual strings are used to represent ML-compressible image portions, the textual strings themselves may be further compressed. For example, the textual strings of a plurality of compressed image data files may be compressed using a text compression algorithm, such as, for example, Huffman coding. Thus, using textual strings as compressed representations may allow for generation of efficient compressed representations of image data and an additional layer of compression for the textual strings themselves. Compression of the textual strings may be especially beneficial in the context of an image database, where a large number of textual strings may be present.

IV. Example Image Data and Reconstructions Thereof

Figure 5A:
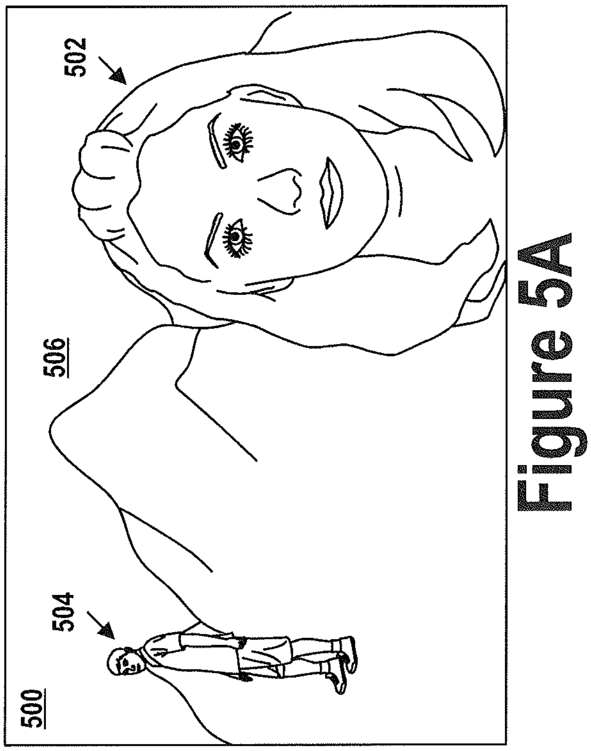
FIGS. 5A, 5B, 5C, and 5D illustrate example images, in accordance with examples described herein.
Figure 5B:
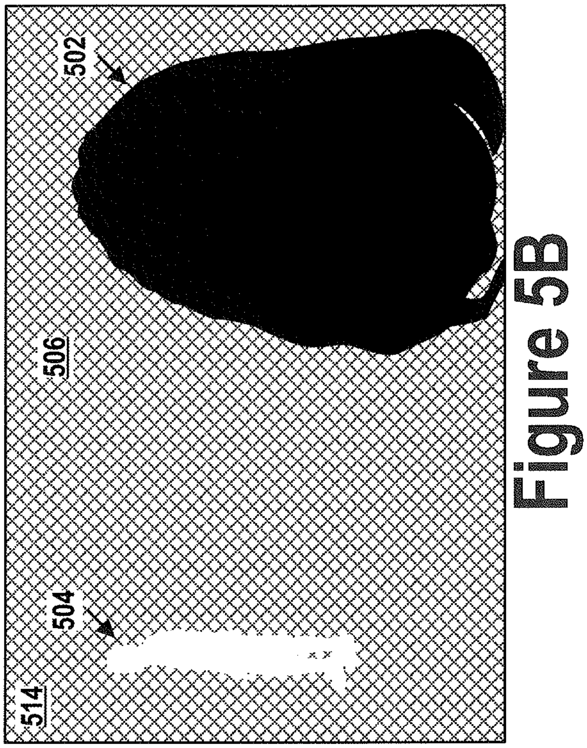
Figure 5C:
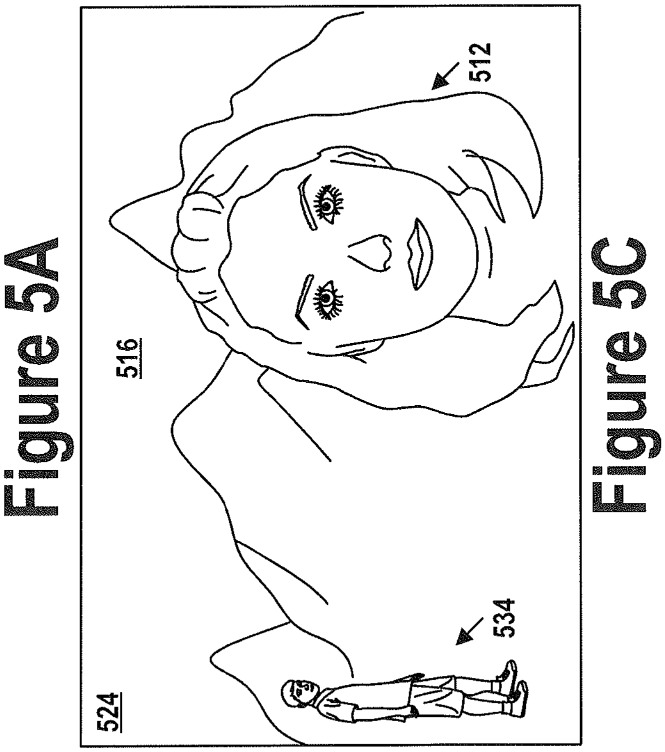
Figure 5D:
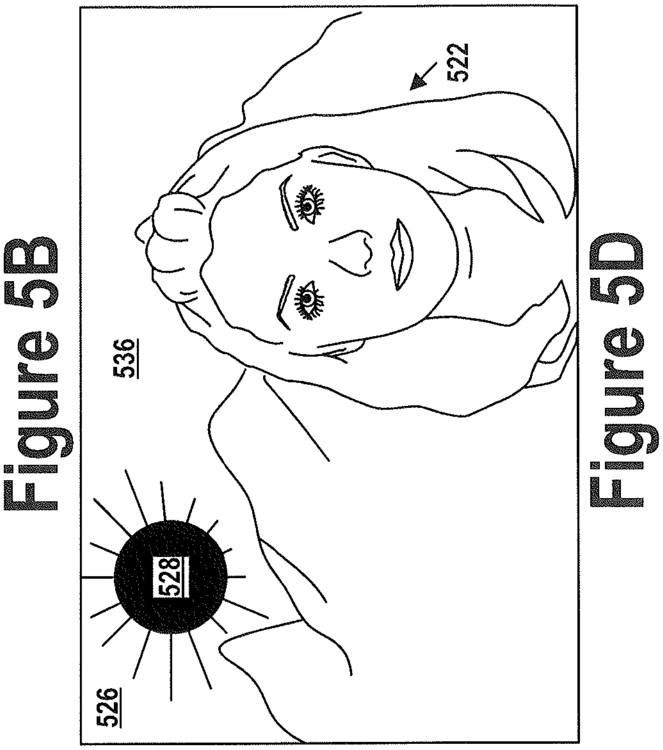

FIGS. 5A, 5B, 5C, and 5D illustrate example image data that may be processed, used, and/or generated by ML compression system 306 and ML decompression system 322. Specifically, FIG. 5A includes image 500, which may be an example of image data 302. FIG. 5B includes image 514, which may be an example of location data 314 and/or 320. FIG. 5C and 5D include images 524 and 526, respectively, which may be examples of image data reconstructions 324 and/or 326.

Image 500 (e.g., a "selfie") may include actor 502, actor 504, and background 506. Actor 502 may be an intended subject of image 500, while actor 504 may be an incidental and/or unintended subject of image 500, and may be unrelated to actor 502. Background 506 may include a mountain landscape, which may be a frequently photographed location (e.g., Denali in Alaska, USA). Thus, an image database in which image 500 may be stored is likely to contain other images of background 506 captured at different times and/or by different camera devices.

Image 514 represents the locations of different image contents of image 500 using a segmentation map. Specifically, image 514 represents a segmentation of actor 504 using a solid white fill, a segmentation of actor 502 using a solid black fill, and a segmentation of background 506 using a hatched pattern. In some implementations, image 514, a variation thereof, and/or a portion thereof might be explicitly included in the compressed image data file generated for image 500. In other implementations, image 514 may be generated by compressible portion detector 400 and used by model selector 406 and/or ML compression models 408-410 during compression, but might not be explicitly included in the compressed image data file. Instead, the positioning of actor 502, actor 504, and background 506 may be represented using, for example, the textual string included as part of the compressed representation of image 500.

A first example compressed representation of image 500 may be "a woman ($v_{woman}=[w_1, w_2, \ldots, w_n]$) taking a selfie in front of Denali ($v_{Denali}=[l_1, l_2, \ldots, l_n]$) with a man in the background," where $v_{woman}$ is a face embedding of actor 502 and $v_{Denali}$ is an embedding vector for background 506. An embedding vector of actor 504 might not be included in the compressed representation, since actor 504 might not be relevant to the user (e.g., actor 502) by and/or for which image 500 is being compressed. A second example compressed representation of image 500 may be "a woman ($i_{woman}=[i_1, i_2, \ldots, i_m]$) taking a selfie in front of Denali ($g_{Denali}=[g_{latitude}, g_{longitude}]$) with a man in the background," where $i_{woman}$ is a non-ML-compressed representation of actor 502 and $g_{Denali}$ represents the geographic coordinates at which image 500 was taken (thus indirectly representing background 506). A third example compressed representation of image 500 may be similar to the first or second example compressed representation, but might omit "a man in the background," since the presence of actor 504 in image 500 may be irrelevant or detrimental from the perspective of the user by and/or for which image 500 is being compressed.

Whether the first compressed representation, the second compressed representation, or the third compressed representation is used may depend on user-specific data 424 associated with the user by and/or for which image 500 is being compressed. Using $i_{woman}$ rather than $v_{woman}$ may result in a more visually accurate reconstruction of actor 502 at the cost of a larger compressed image data file. Similarly, using $v_{Denali}$ rather than $g_{Denali}$ may result in a more visually accurate reconstruction of background 506 at the cost of a larger compressed image data file.

Images 524 and 526 include example image data reconstructions of image 500. For example, image 524 may be based on the first example compressed representation of image 500 (i.e., "a woman ($v_{woman}$) taking a selfie in front of Denali ($v_{Denali}$) with a man in the background,"), while image 526 may be based on the third example compressed representation of image 500 (i.e., "a woman ($i_{woman}$) taking a selfie in front of Denali ($g_{Denali}$)"). Accordingly, the reconstruction 512 in image 524 of actor 502 may be less visually accurate than reconstruction 522 in image 526 of actor 502. For example, reconstruction 512 may include a shorter hair length and a slightly narrower nose than that shown in image 500, while reconstruction 522 may be identical to what is shown in image 500. Additionally, image 526 may include a reconstruction 534 of actor 504, albeit in a different pose, while image 526 might not include any reconstruction of actor 504. Further, reconstruction 516 in image 524 of background 506 may be more visually accurate than reconstruction 536 in image 526. For example, the perspective and time of day represented by reconstruction 516 may match image 500 more closely than the perspective and time of day represented by reconstruction 536, as indicated by the different heights of the mountains and the sun 528 in reconstruction 536.

V. Example Video Compression

Figure 6:
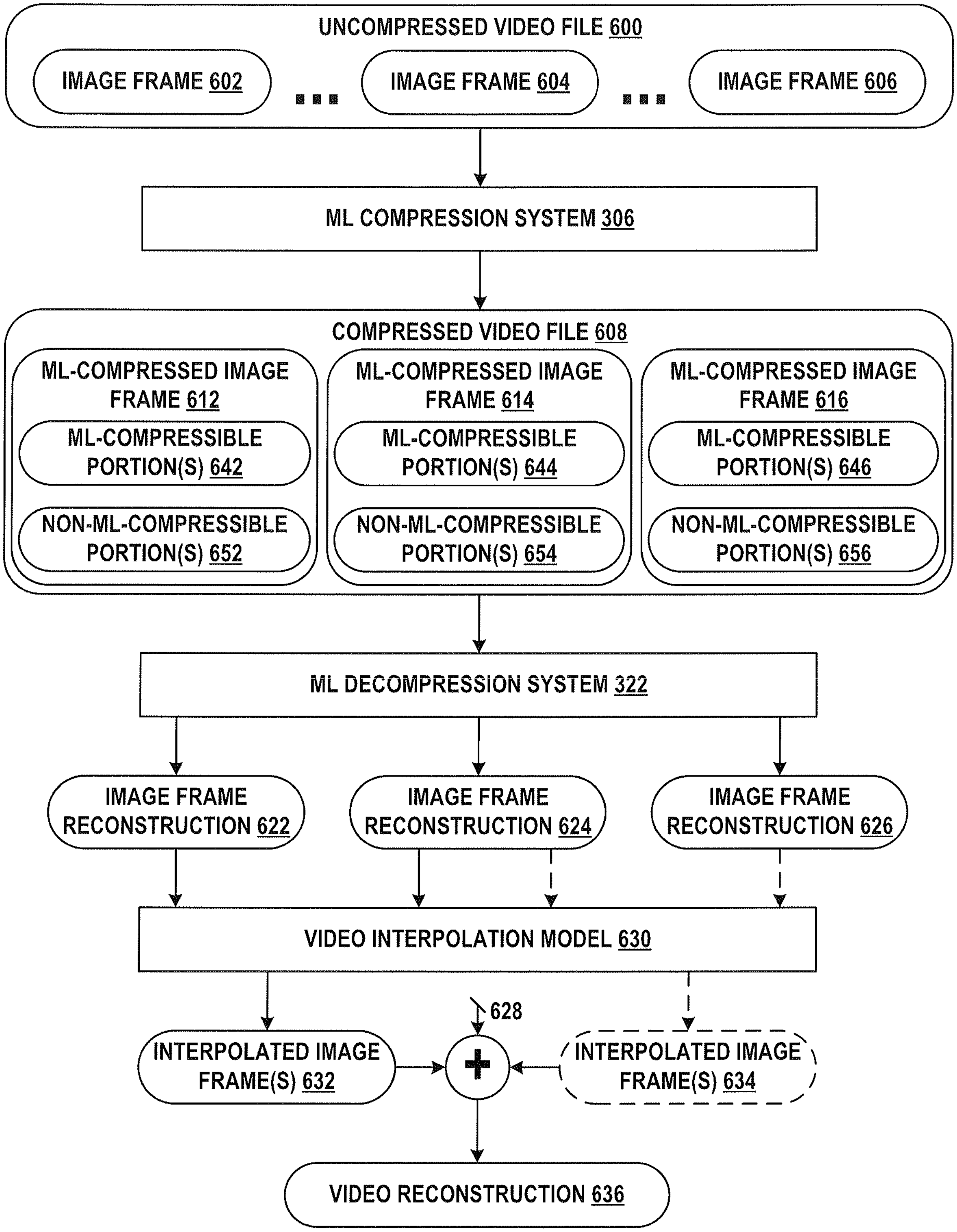
FIG. 6 illustrates a video interpolating system, in accordance with examples described herein.

FIG. 6 illustrates an example ML-based system for compressing, decompressing, and interpolating video data. The ML-based system of FIG. 6 may be viewed as a variation of the system of FIG. 3, with video being used as a specific example of image data. Specifically, the ML-based system of FIG. 6 may include ML compression system 306, ML decompression system 322, and video interpolation model 630. Video interpolation model 630 may allow systems 306 and 322 to compress and decompress, respectively, a subset of video 600, rather than the entirety of video 600, thus further improving the compression ratio of video 600.

Uncompressed video file 600 may include a plurality of image frames, including image frame 602 through image frame 604 and image frame 604 through image frame 606 (i.e., collectively, image frames 602-606). Uncompressed video file 600 may be an example of uncompressed image data file 300. ML compression system 306 may be configured to generate compressed video file 608 based on uncompressed video file 600. Compressed video file 608 may include ML-compressed image frame 612, ML-compressed image frame 614, and ML-compressed image frame 616.

ML-compressed image frames 612, 614, and 616 may be a compressed versions of, respectively, image frames 602, 604, and 606, and may include ML-compressible portion(s) 642, 644, and 646, respectively, and non-ML-compressible portion(s) 652, 654, and 656, respectively. Each of ML-compressible portions 642, 644, and 646 may be associated with a corresponding ML-compressed representation and, in some cases, corresponding location data. Similarly, each of non-ML-compressible portions 652, 654, and 656 may be associated with a corresponding non-ML-compressed representation and, in some cases, corresponding location data. Additionally, uncompressed video file 600 may include corresponding attribute data, which may also be included in compressed video file 608. Thus, compressed video file 608 may be an example of compressed image data file 308.

In some implementations, ML compression system 306 may be configured to generate a corresponding ML-compressed image frame for each of image frames 602-606. However, since image frames 602-606 may contain redundant image content, at least some of image frames 602-606 may be omitted from compressed video file 608, and may instead be interpolated by video interpolation model 630. In one example, ML compression system 306 may be configured to compress every nth image frame (e.g., every 30th image frame) of uncompressed video file 600. Thus, image frames 602 and 604, and image frames 604 and 606, may be separated from one another by a fixed number of intermediate image frames.

In another example, ML compression system 306 may be configured to compress a given image frame of uncompressed video file 600 when the given image frame differs from a previous compressed image frame of uncompressed video file 600 by more than a threshold extent. The difference between the previous compressed image frame and the given image frame may be quantified, for example, by compressible portion detector 400 using a similarity metric in pixel space and/or in latent feature space. Accordingly, ML compression system 306 may be configured to quantify the extent of redundancy between image frames, and compress image frames that exhibit no more than a predetermined extent of redundancy. Thus, image frames 602 and 604, and image frames 604 and 606, may be separated from one another by a variable number of intermediate image frames, and this variable number may be represented as part of compressed video file 608.

ML decompression system 322 may be configured to generate image frame reconstructions 622, 624, and 626 based on ML compressed image frames 612, 614, and 616, respectively, of compressed video file 608. Accordingly, image frame reconstructions 622, 624, and 626 may be reconstructions of image frames 602, 604, and 606, respectively. Thus, image frame reconstructions 622, 624, and 626 may be examples of image data reconstruction 324.

Video interpolation model 630 may be configured to generate interpolated image frame(s) 632 based on image frame reconstructions 622 and 624. Thus, interpolated image frame(s) 632 may be an attempt at replicating the image frames positioned between image frame 602 and image frame 604 that, as indicated by the ellipsis, were not included in compressed video file 608. Video interpolation model 630 may also be configured to generate interpolated image frame(s) 634 based on image frame reconstructions 624 and 626. Thus, interpolated image frame(s) 634 may be an attempt at replicating the image frames positioned between image frame 604 and image frame 606 that, as indicated by the ellipsis, were not included in compressed video file 608. A number of interpolated image frame(s) 632 and 634 may be based on and/or equal to the number of intermediate image frames omitted from compressed video file 608 at the compression stage.

Video interpolation model 630 may include aspects of one or more of: the model discussed in a paper titled "RIFE: Real-Time Intermediate Flow Estimation for Video Frame Interpolation," authored by Huang et al., and published as arXiv: 2011.06294, the model discussed in a paper titled "Super SloMo: High Quality Estimation of Multiple Intermediate Frames for Video Interpolation," authored by Jiang et al., and published as arXiv: 1712.00080, the model discussed in a paper titled "Video Frame Interpolation via Adaptive Separable Convolution," authored by Niklaus et al., and published as arXiv: 1708.01692, and/or the model discussed in a paper titled "Depth-Aware Video Frame Interpolation," authored by Bao et al., and published as arXiv: 1904.00830, among other possibilities.

Video reconstruction 636 may be generated by combining image frame reconstructions 622, 624, and 626 (indicated by arrow 628), interpolated image frame(s) 632, and interpolated image frame(s) 634. Thus, video reconstruction 636 may approximate the spatial and/or temporal content of uncompressed video file 600.

VI. Example Training Operations

Figure 7:
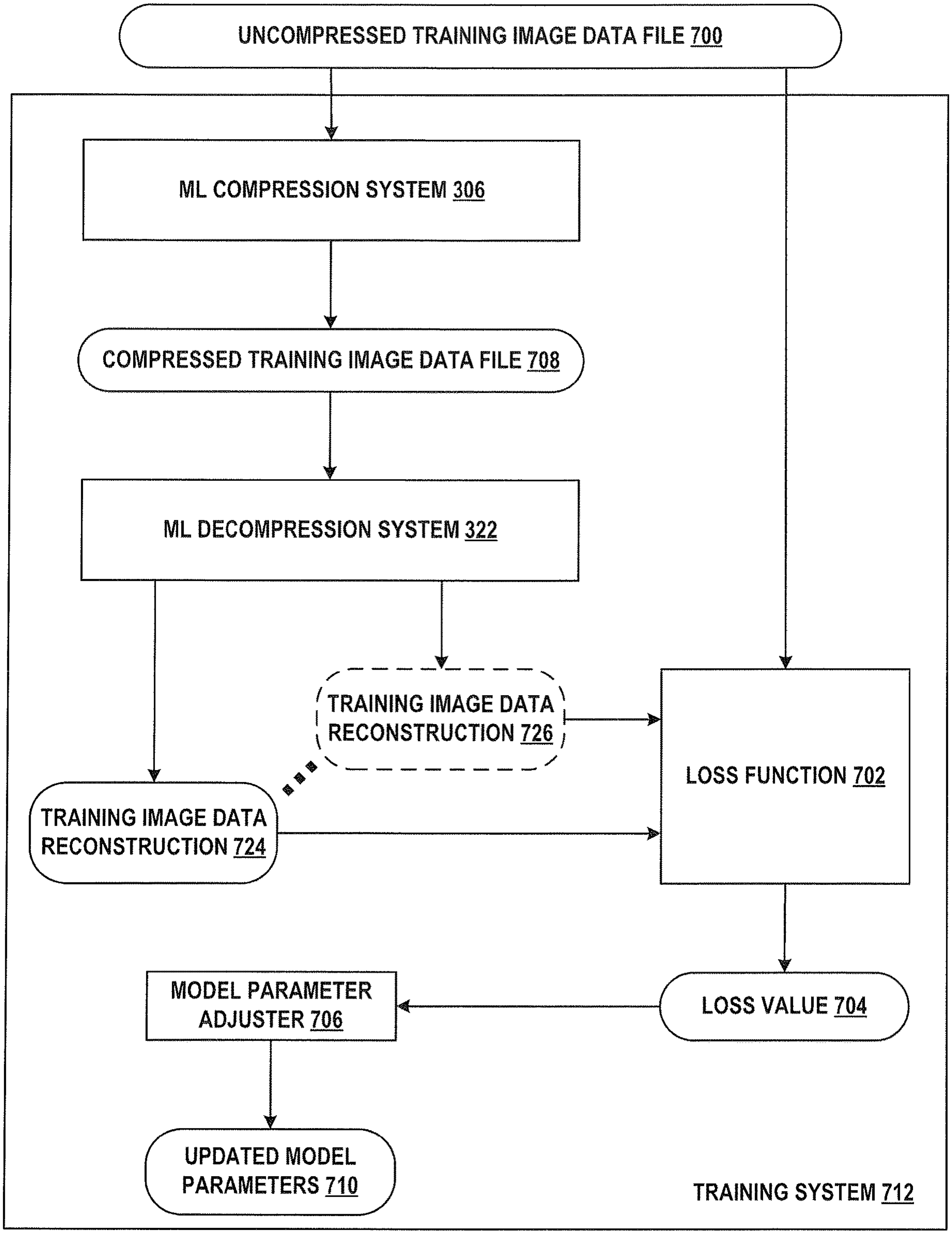
FIG. 7 illustrates a training system, in accordance with examples described herein.

FIG. 7 illustrates an example training system 712 that may be used to train ML compression system 306 and/or ML decompression system 322. Specifically, training system 712 may include ML compression system 306, ML decompression system 322, loss function 702, and model parameter adjuster 706. Training system 712 may be configured to determine updated model parameters 710 based on uncompressed training image data file 700. Uncompressed training image data file 700 may be analogous to uncompressed image data file 300, but may be processed at training time rather than at inference time.

ML compression system 306 may be configured to generate, based on uncompressed training image data file 700, compressed training image data file 708, which may be analogous to compressed image data file 308. Thus, compressed training image data file 708 may include ML-compressed training representation(s) of ML-compressible portions of the image data of uncompressed training image data file 700, and possibly also non-ML-compressed training representations of non-ML-compressible portion(s) of the image data of uncompressed training image data file 700. ML decompression system 322 may be configured to generate, based on compressed training image data file 708, training image data reconstruction 724 through training image data reconstruction 726 (i.e., training image data reconstructions 724-726), which may be analogous to image data reconstructions 324-326.

A quality with which systems 306 and 322 compress and decompress the image data of uncompressed training image data file 700 may be quantified using loss function 702. Loss function 702 may be configured to generate loss value 704 based on training image data reconstructions 724-726 and uncompressed training image data file 700. Loss function 702 may include a weighted sum of a plurality of different loss terms. For example, loss function 702 may be a weighted sum of a pixel-space loss term, a perceptual loss term, an adversarial loss term, and possibly other loss terms that may be determined by training system 712.

The pixel-space loss term may be based on a per-pixel difference between (i) the image data of uncompressed training data file 700 and (ii) one or more of training image data reconstructions 724-726. The perceptual loss term may be based on a comparison of (i) a perceptual feature representation of the image data of uncompressed training data file 700 and (ii) perceptual feature representations of one or more of training image data reconstructions 724-726. The perceptual feature representations may be generated by a pre-trained perceptual loss model, and may include vector embeddings of the corresponding image data that are indicative of various visual features of the corresponding image data. The adversarial loss term (e.g., a hinge adversarial loss) may be based on an output of a discriminator model. Specifically, the output of the discriminator model may indicate whether the discriminator model estimates that training image data reconstructions 724-726 are a result of compression followed by decompression or are original uncompressed image data. Thus, ML compression system 306, ML decompression system 322, and the discriminator model may implement an adversarial training architecture. The adversarial loss term may thus incentivize systems 306 and 322 to generate inpainted image content that appears natural, realistic, non-artificial, and/or non-compressed.

Model parameter adjuster 706 may be configured to determine updated model parameters 710 based on loss value 704. Updated model parameters 710 may include one or more updated parameters of any trainable component of system 306, system 322, and/or video interpolation model 630, including, for example, compressible portion detector 400, model selector 406, ML compression models 408-410, ML decompression models 412-414, and/or compositing model 420, among other possibilities. In some cases, a subset of system 306 and/or system 322 may be pretrained, and training system 712 may be used to train other components of systems 306 and 322 while holding fixed parameters of the pretrained components. For example, ML compression models 408-410 and ML decompression models 412-414 may be jointly pretrained, and may subsequently be held fixed by training system 712 while parameters of other components of systems 306 and 322 are adjusted.

Model parameter adjuster 706 may be configured to determine updated model parameters 710 by, for example, determining a gradient of loss function 702. Based on this gradient and loss value 704, model parameter adjuster 706 may be configured to select updated model parameters 710 that are expected to reduce loss value 704, and thus improve performance of systems 306 and 322. After applying updated model parameters 710 to systems 306 and/or 322, the operations discussed above may be repeated to compute another instance of loss value 704 and, based thereon, another instance of updated model parameters 710 may be determined and applied to systems 306 and/or 322 to further improve the performance thereof. Such training of systems 306 and/or 322 may be repeated until, for example, loss value 704 is reduced to below a target threshold loss value.

VII. Additional Example Operations

Figure 8:
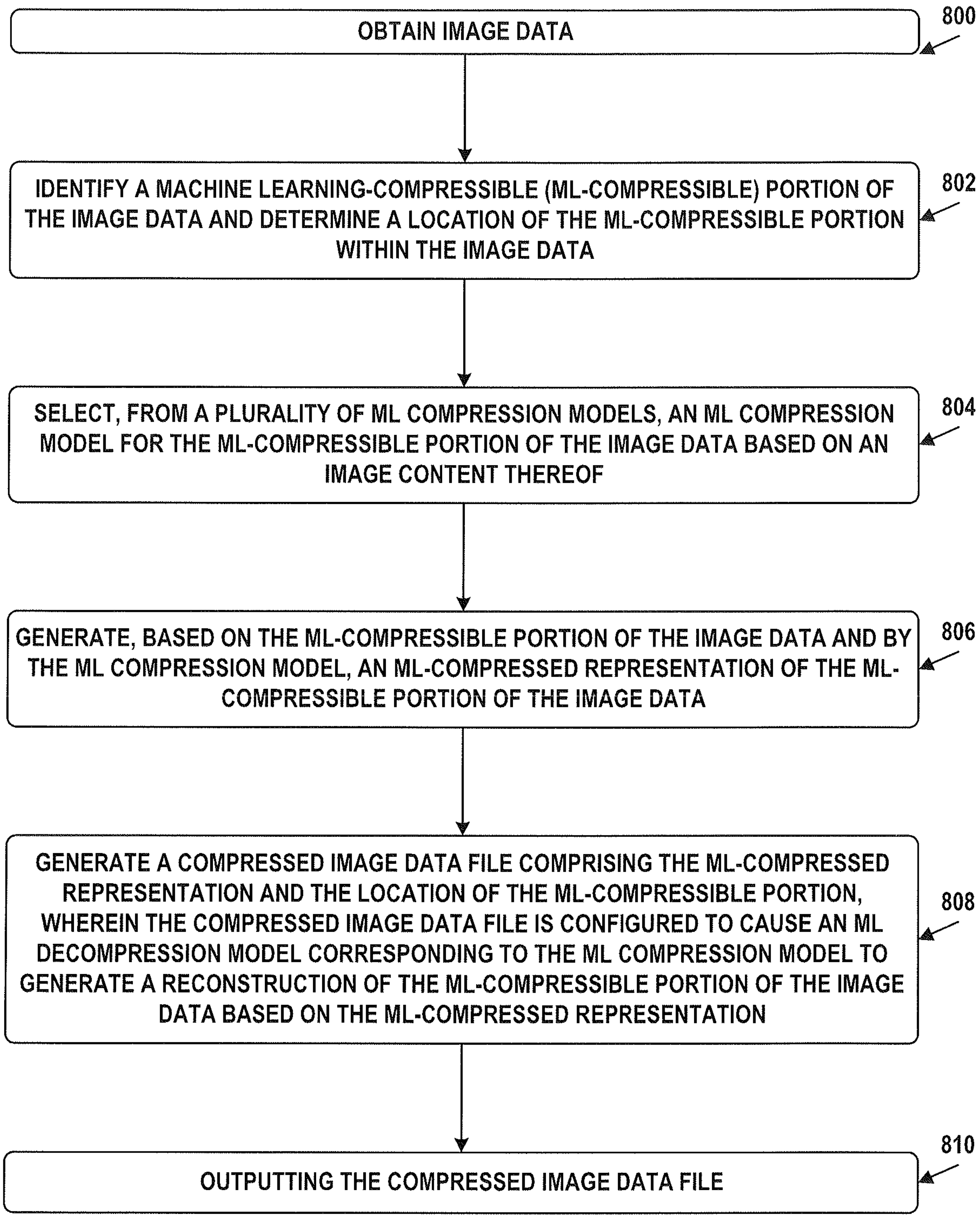
FIG. 8 illustrates a flow chart, in accordance with examples described herein.

FIG. 8 illustrates a flow chart of operations related to ML-based image data compression. The operations may be carried out by computing device 100, computing system 200, ML compression system 306, ML decompression system 322, video interpolation model 630, and/or training system 712, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining image data.

Block 802 may involve identifying a machine learning-compressible (ML-compressible) portion of the image data and determining a location of the ML-compressible portion within the image data.

Block 804 may involve selecting, from a plurality of ML compression models, an ML compression model for the ML-compressible portion of the image data based on an image content thereof.

Block 806 may involve generating, based on the ML-compressible portion of the image data and by the ML compression model, an ML-compressed representation of the ML-compressible portion of the image data.

Block 808 may involve generating a compressed image data file that includes the ML-compressed representation and the location of the ML-compressible portion. The compressed image data file may be configured to cause an ML decompression model corresponding to the ML compression model to generate a reconstruction of the ML-compressible portion of the image data based on the ML-compressed representation.

Block 810 may involve outputting the compressed image data file.

In some embodiments, one or more of (i) a frequency content of the reconstruction of the ML-compressible portion or (ii) a resolution of the reconstruction of the ML-compressible portion may be substantially lossless with respect to the ML-compressible portion, and a visual accuracy of the reconstruction of the ML-compressible portion may be lossy with respect to the ML-compressible portion.

In some embodiments, a non-ML-compressible portion of the image data may be identified, and a location of the non-ML-compressible portion within the image data may be determined. The compressed image data file may further include the non-ML-compressible portion and the location of the non-ML-compressible portion. The compressed image data file may be configured to provide for reconstructing the image data by compositing the reconstruction of the ML-compressible portion of the image data with the non-ML-compressible portion of the image data.

In some embodiments, each respective ML compression model of the plurality of ML compression models may be configured to generate ML-compressed representations for a corresponding type of image content. Selecting the ML compression model may include determining a type of the image content of the ML-compressible portion and, based on the type of the image content of the ML-compressible portion, selecting the ML compression model from the plurality of ML compression models.

In some embodiments, identifying the ML-compressible portion of the image data and determining the location of the ML-compressible portion within the image data may include generating, by a segmentation model, a segmentation mask indicating pixels of the image data that represent the ML-compressible portion of the image data.

In some embodiments, identifying the ML-compressible portion of the image data and determining the location of the ML-compressible portion within the image data may include dividing the image data into a grid that includes a plurality of cells each including a respective plurality of pixels. For each respective cell of the plurality of cells, it may be determined whether the respective plurality of pixels represents image content that is ML-compressible by at least one ML compression model of the plurality of ML compression models. The ML-compressible portion may be identified based on determining that the respective plurality of pixels of a particular cell of the plurality of cells represents the image content that is ML-compressible by the ML compression model.

In some embodiments, identifying the ML-compressible portion of the image data and determining the location of the ML-compressible portion within the image data may include displaying, by way of a user interface, the image data and receiving, by way of the user interface, a manual selection of the ML-compressible portion from the image data as displayed.

In some embodiments, identifying the ML-compressible portion of the image data may include dividing the image data into a plurality of semantically-distinct ML-compressible portions. Determining the location of the ML-compressible portion within the image data may include determining, for each respective ML-compressible portion of the plurality of semantically-distinct ML-compressible portions, a corresponding location of the respective ML-compressible portion. Selecting the ML compression model may include selecting, for each respective ML-compressible portion of the plurality of semantically-distinct ML-compressible portions and from the plurality of ML compression models, a corresponding ML compression model based on a respective image content of the respective ML-compressible portion. Generating the ML-compressed representation may include generating, for each respective ML-compressible portion of the plurality of semantically-distinct ML-compressible portions and by the corresponding ML compression model, a corresponding ML-compressed representation of the respective ML-compressible portion based on the respective ML-compressible portion. The compressed image data file may include, for each respective ML-compressible portion of the plurality of semantically-distinct ML-compressible portions, the corresponding ML-compressed representation and the corresponding location. Each respective ML compression model of the plurality of ML compression models may be associated with a corresponding ML decompression model configured to generate reconstructions of ML-compressible portions of image data based on ML-compressed representations generated by the respective ML compression model.

In some embodiments, the ML-compressible portion may be identified based on an importance of the image content of the ML-compressible portion. The importance, may, for example, be based upon input from a user associated with the image data. A variability of the reconstruction of the ML-compressible portion may be inversely proportional to the importance of the image content to the user.

In some embodiments, the ML-compressed representation may include one or more of: (i) a vector representing the image content of the ML-compressible portion of the image data or (ii) a textual string describing the image content of the ML-compressible portion of the image data. The ML decompression model may be configured to generate the reconstruction of the ML-compressible portion of the image data based on the one or more of: (i) the vector or (ii) the textual string.

In some embodiments, an image database may be configured to store a plurality of compressed image data files corresponding to a plurality of image data. For each respective compressed image data file of the plurality of compressed image data files, a corresponding textual string of the respective compressed image data file may be ML-compressed using a text compression algorithm. The respective compressed image data file may be configured to store the ML-compressed corresponding textual string.

In some embodiments, the compressed image data file may be received. The reconstruction of the ML-compressible portion of the image data may be generated based on the ML-compressed representation and by the ML decompression model. A decompressed image data may be generated by positioning, within the decompressed image data, the reconstruction of the ML-compressible portion according to the location of the ML-compressible portion.

In some embodiments, generating the reconstruction of the ML-compressible portion of the image data may include identifying, within an image database, one or more reference image data based on a similarity between the ML-compressed representation and respective ML-compressed representations of the one or more reference image data. Generating the reconstruction of the ML-compressible portion of the image data may also include generating the reconstruction of the ML-compressible portion further based on respective image content of the one or more reference image data.

In some embodiments, generating the reconstruction of the ML-compressible portion of the image data may include receiving a request to modify an attribute of the ML-compressible portion. The attribute may be represented by the ML-compressed representation. Generating the reconstruction of the ML-compressible portion of the image data may also include generating an adjusted ML-compressed representation by modifying a value of the ML-compressed representation, and generating the reconstruction of the ML-compressible portion based on the adjusted ML-compressed representation.

In some embodiments, generating the reconstruction of the ML-compressible portion of the image data may include generating, by the ML decompression model, a plurality of different reconstructions of the ML-compressible portion of the image data, displaying the plurality of different reconstructions of the ML-compressible portion of the image data, and receiving a selection of a particular reconstruction from the plurality of different reconstructions. The decompressed image data may be generated based on the particular reconstruction.

In some embodiments, the compressed image data file may further include image attribute data comprising one or more of: (i) a time at which the image data has been captured, (ii) weather conditions at the time at which the image data has been captured, (iii) a geographic location associated with the image data, (iv) one or more parameters of a camera used to capture the image data, or (v) sensor data generated by one or more sensors on the camera used to capture the image data. The ML decompression model may be configured to generate the reconstruction further based on the image attribute data.

In some embodiments, the image data may include a plurality of image frames that form a video. The ML-compressible portion may include (i) a first ML-compressible portion located at a first location of a first image frame of the plurality of image frames and (ii) a second ML-compressible portion located at a second location of a second image frame of the plurality of image frames. The first ML-compressible portion and the second ML-compressible portion may each represent the same image content at different respective times. The ML-compressed representation may include a first ML-compressed representation of the first ML-compressible portion and a second ML-compressed representation of the second ML-compressible portion. The ML decompression model may be configured to generate a first reconstruction of the first ML-compressible portion based on the first ML-compressed representation and a second reconstruction of the second ML-compressible portion based on the second ML-compressed representation.

In some embodiments, the first reconstruction may be generated by the ML decompression model based on the first ML-compressed representation, and the second reconstruction may be generated by the ML decompression model based on the second ML-compressed representation. A first decompressed image frame may be generated by positioning, within the first decompressed image frame, the first reconstruction according to the first location, and a second decompressed image frame may be generated by positioning, within the second decompressed image frame, the second reconstruction according to the second location. An interpolated image frame positioned between the first decompressed image frame and the second decompressed image frame within the video may be generated by a video interpolation model based on the first decompressed image frame and the second decompressed image frame.

In some embodiments, outputting the compressed image data file may involve storing the compressed image data file in persistent storage.

In some embodiments, outputting the compressed image data file may involve transmitting the compressed image data file from a first computing device to a second computing device.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining image data;

identifying a machine learning-compressible (ML-compressible) portion of the image data and determining a location of the ML-compressible portion within the image data;

selecting, from a plurality of machine learning (ML) compression models, an ML compression model for the ML-compressible portion of the image data based on an image content thereof;

generating, based on the ML-compressible portion of the image data and by the ML compression model, an ML-compressed representation of the ML-compressible portion of the image data;

generating a compressed image data file comprising the ML-compressed representation and the location of the ML-compressible portion, wherein the compressed image data file is configured to cause an ML decompression model corresponding to the ML compression model to generate a reconstruction of the ML-compressible portion of the image data based on the ML-compressed representation; and outputting the compressed image data file.

2. The computer-implemented method of claim 1, wherein one or more of (i) a frequency content of the reconstruction of the ML-compressible portion or (ii) a resolution of the reconstruction of the ML-compressible portion is substantially lossless with respect to the ML-compressible portion, and wherein a visual accuracy of the reconstruction of the ML-compressible portion is lossy with respect to the ML-compressible portion.

3. The computer-implemented method of claim 1, further comprising:

identifying a non-ML-compressible portion of the image data and determining a location of the non-ML-compressible portion within the image data, wherein the compressed image data file further comprises the non-ML-compressible portion and the location of the non-ML-compressible portion, and wherein the compressed image data file is configured to provide for reconstructing the image data by compositing the reconstruction of the ML-compressible portion of the image data with the non-ML-compressible portion of the image data.

4. The computer-implemented method of claim 1, wherein each respective ML compression model of the plurality of ML compression models is configured to generate ML-compressed representations for a corresponding type of image content, and wherein selecting the ML compression model comprises:

determining a type of the image content of the ML-compressible portion; and based on the type of the image content of the ML-compressible portion, selecting the ML compression model from the plurality of ML compression models.

5. The computer-implemented method of claim 1, wherein identifying the ML-compressible portion of the image data and determining the location of the ML-compressible portion within the image data comprises:

generating, by a segmentation model, a segmentation mask indicating pixels of the image data that represent the ML-compressible portion of the image data.

6. The computer-implemented method of claim 1, wherein identifying the ML-compressible portion of the image data and determining the location of the ML-compressible portion within the image data comprises:

dividing the image data into a grid comprising a plurality of cells each comprising a respective plurality of pixels;

determining, for each respective cell of the plurality of cells, whether the respective plurality of pixels represents image content that is ML-compressible by at least one ML compression model of the plurality of ML compression models; and identifying the ML-compressible portion based on determining that the respective plurality of pixels of a particular cell of the plurality of cells represents the image content that is ML-compressible by the ML compression model.

7. The computer-implemented method of claim 1, wherein identifying the ML-compressible portion of the image data and determining the location of the ML-compressible portion within the image data comprises:

displaying, by way of a user interface, the image data; and receiving, by way of the user interface, a manual selection of the ML-compressible portion from the image data as displayed.

8. The computer-implemented method of claim 1, wherein:

identifying the ML-compressible portion of the image data comprises dividing the image data into a plurality of semantically-distinct ML-compressible portions;

determining the location of the ML-compressible portion within the image data comprises determining, for each respective ML-compressible portion of the plurality of semantically-distinct ML-compressible portions, a corresponding location of the respective ML-compressible portion;

selecting the ML compression model comprises selecting, for each respective ML-compressible portion of the plurality of semantically-distinct ML-compressible portions and from the plurality of ML compression models, a corresponding ML compression model based on a respective image content of the respective ML-compressible portion;

generating the ML-compressed representation comprises generating, for each respective ML-compressible portion of the plurality of semantically-distinct ML-compressible portions and by the corresponding ML compression model, a corresponding ML-compressed representation of the respective ML-compressible portion based on the respective ML-compressible portion;

the compressed image data file comprises, for each respective ML-compressible portion of the plurality of semantically-distinct ML-compressible portions, the corresponding ML-compressed representation and the corresponding location; and each respective ML compression model of the plurality of ML compression models is associated with a corresponding ML decompression model configured to generate reconstructions of ML-compressible portions of image data based on ML-compressed representations generated by the respective ML compression model.

9. The computer-implemented method of claim 1, wherein the ML-compressible portion is identified based on an importance of the image content of the ML-compressible portion, and wherein a variability of the reconstruction of the ML-compressible portion is inversely proportional to the importance of the image content.

10. The computer-implemented method of claim 1, wherein the ML-compressed representation comprises one or more of: (i) a vector representing the image content of the ML-compressible portion of the image data or (ii) a textual string describing the image content of the ML-compressible portion of the image data, wherein the ML decompression model is configured to generate the reconstruction of the ML-compressible portion of the image data based on the one or more of: (i) the vector or (ii) the textual string.

11. The computer-implemented method of claim 10, wherein an image database is configured to store a plurality of compressed image data files corresponding to a plurality of image data, and wherein the computer-implemented method further comprises:

compressing, using a text compression algorithm and for each respective compressed image data file of the plurality of compressed image data files, a corresponding textual string of the respective compressed image data file, wherein the respective compressed image data file is configured to store the corresponding textual string.

12. The computer-implemented method of claim 1, further comprising:

receiving the compressed image data file;

generating, based on the ML-compressed representation and by the ML decompression model, the reconstruction of the ML-compressible portion of the image data; and generating decompressed image data by positioning, within the decompressed image data, the reconstruction of the ML-compressible portion according to the location of the ML-compressible portion.

13. The computer-implemented method of claim 12, wherein generating the reconstruction of the ML-compressible portion of the image data comprises:

identifying, within an image database, one or more reference image data based on a similarity between the ML-compressed representation and respective ML-compressed representations of the one or more reference image data; and generating the reconstruction of the ML-compressible portion further based on respective image content of the one or more reference image data.

14. The computer-implemented method of claim 12, wherein generating the reconstruction of the ML-compressible portion of the image data comprises:

receiving a request to modify an attribute of the ML-compressible portion, wherein the attribute is represented by the ML-compressed representation;

generating an adjusted ML-compressed representation by modifying a value of the ML-compressed representation; and generating the reconstruction of the ML-compressible portion based on the adjusted ML-compressed representation.

15. The computer-implemented method of claim 12, wherein generating the reconstruction of the ML-compressible portion of the image data comprises:

generating, by the ML decompression model, a plurality of different reconstructions of the ML-compressible portion of the image data;

displaying the plurality of different reconstructions of the ML-compressible portion of the image data; and receiving a selection of a particular reconstruction from the plurality of different reconstructions, wherein the decompressed image data is generated based on the particular reconstruction.

16. The computer-implemented method of claim 1, wherein the compressed image data file further comprises image attribute data comprising one or more of: (i) a time at which the image data has been captured, (ii) weather conditions at the time at which the image data has been captured, (iii) a geographic location associated with the image data, (iv) one or more parameters of a camera used to capture the image data, or (v) sensor data generated by one or more sensors on the camera used to capture the image data, and wherein the ML decompression model is configured to generate the reconstruction further based on the image attribute data.

17. The computer-implemented method of claim 1, wherein the image data comprises a plurality of image frames that form a video, wherein the ML-compressible portion comprises (i) a first ML-compressible portion located at a first location of a first image frame of the plurality of image frames and (ii) a second ML-compressible portion located at a second location of a second image frame of the plurality of image frames, wherein the first ML-compressible portion and the second ML-compressible portion each represent a same image content at different respective times, wherein the ML-compressed representation comprises a first ML-compressed representation of the first ML-compressible portion and a second ML-compressed representation of the second ML-compressible portion, and wherein the ML decompression model is configured to generate a first reconstruction of the first ML-compressible portion based on the first ML-compressed representation and a second reconstruction of the second ML-compressible portion based on the second ML-compressed representation.

18. The computer-implemented method of claim 17, further comprising:

generating, by the ML decompression model, the first reconstruction based on the first ML-compressed representation and the second reconstruction based on the second ML-compressed representation;

generating (i) a first decompressed image frame by positioning, within the first decompressed image frame, the first reconstruction according to the first location and (ii) a second decompressed image frame by positioning, within the second decompressed image frame, the second reconstruction according to the second location; and generating, by a video interpolation model and based on the first decompressed image frame and the second decompressed image frame, an interpolated image frame positioned between the first decompressed image frame and the second decompressed image frame within the video.

19. A system comprising:

a processor; and a non-transitory computer-readable medium having stored thereon instructions that, when executed by the processor, cause the processor to perform operations comprising:

obtaining image data;

identifying a machine learning-compressible (ML-compressible) portion of the image data and determining a location of the ML-compressible portion within the image data;

selecting, from a plurality of machine learning (ML) compression models, an ML compression model for the ML-compressible portion of the image data based on an image content thereof;

generating, based on the ML-compressible portion of the image data and by the ML compression model, an ML-compressed representation of the ML-compressible portion of the image data;

generating a compressed image data file comprising the ML-compressed representation and the location of the ML-compressible portion, wherein the compressed image data file is configured to cause an ML decompression model corresponding to the ML compression model to generate a reconstruction of the ML-compressible portion of the image data based on the ML-compressed representation; and outputting the compressed image data file.

20. A non-transitory computer-readable medium having stored thereon instructions that, when executed by a computing device, cause the computing device to perform operations comprising:

obtaining image data;

identifying a machine learning-compressible (ML-compressible) portion of the image data and determining a location of the ML-compressible portion within the image data;

selecting, from a plurality of machine learning (ML) compression models, an ML compression model for the ML-compressible portion of the image data based on an image content thereof;

generating, based on the ML-compressible portion of the image data and by the ML compression model, an ML-compressed representation of the ML-compressible portion of the image data;

generating a compressed image data file comprising the ML-compressed representation and the location of the ML-compressible portion, wherein the compressed image data file is configured to cause an ML decompression model corresponding to the ML compression model to generate a reconstruction of the ML-compressible portion of the image data based on the ML-compressed representation; and outputting the compressed image data file.

* * * * *